(12) United States Patent
Kim et al.

(10) Patent No.: US 7,155,671 B1
(45) Date of Patent: Dec. 26, 2006

(54) COMPUTER TECHNIQUE FOR PROVIDING A CHARACTER MISTYPING CONVERSION FUNCTION

(75) Inventors: In-ho Kim, Suwon (KR); Kang-dong Lee, Swuon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 09/352,374

(22) Filed: Jul. 13, 1999

(30) Foreign Application Priority Data

Jul. 15, 1998 (KR) .................................... 98-28656

(51) Int. Cl.
*G06F 17/00* (2006.01)

(52) U.S. Cl. .................... 715/536; 715/535; 715/542

(58) Field of Classification Search ............... 715/536, 715/535, 542
See application file for complete search history.

(56) References Cited

U.S. PATENT DOCUMENTS

| | | |
|---|---|---|
| 4,402,058 A | 8/1983 | Aiken, Jr. et al. |
| 5,127,748 A | 7/1992 | Okimoto et al. |
| 5,617,314 A | 4/1997 | Zhong |
| 5,634,066 A | 5/1997 | Takehara et al. |
| 5,634,134 A | 5/1997 | Kumai et al. |
| 5,713,033 A | 1/1998 | Sado |
| 5,784,069 A | 7/1998 | Daniels et al. |
| 5,802,536 A | 9/1998 | Yoshii et al. |
| 5,907,821 A | 5/1999 | Kaji et al. |

OTHER PUBLICATIONS

Microsoft Press® Computer Dictionary, 3rd Edition, © 1997, pp. 272, 162.*

* cited by examiner

*Primary Examiner*—Stephen S. Hong
*Assistant Examiner*—A. Queler
(74) *Attorney, Agent, or Firm*—Robert E. Bushnell, Esq.

(57) ABSTRACT

An apparatus for converting character mistyping is installed in a computer having a keyboard and a keyboard driver as an input device, and having an operating system for converting a scan code input from the keyboard driver into a character, and for generating a keyboard message in a current window having an input focus. The apparatus consists of: a scan code detector for detecting a scan code when the scan code input through the keyboard is transmitted to a kernel of the operating system via the keyboard driver; a scan code buffer for storing a scan code; a buffer manager for analyzing the scan code detected by the scan code detector, for storing the scan code in the scan code buffer if the analyzed scan code is a character code, and for deleting all scan codes stored in the scan code buffer if the analyzed scan code is not a character code; an event detector for detecting an event indicating a character mistyping conversion; and a character mistyping converter for deleting mistyped characters in the current window having an input focus, and for generating a keyboard message in the current window by character-mistyping-converting the scan code stored in the scan code buffer when an event is detected by the event detector. Thus, the character mistyping conversion can be performed on all application programs or general edition windows running on the operating system without additional code needed for supporting the character mistyping conversion function.

5 Claims, 5 Drawing Sheets

COMPUTER TECHNIQUE FOR PROVIDING A CHARACTER MISTYPING CONVERSION FUNCTION

CLAIM OF PRIORITY

This application makes reference to, incorporates the same herein, and claims all benefits accruing under 35 U.S.C. §119 from my application COMPUTER HAVING CHARACTER MISTYPING CONVERSION FUNCTION FOR GENERAL USE AND CHARACTER MISTYPING CONVERSION METHOD IN COMPUTER filed with the Korean Industrial Property Office on 15 Jul. 1998 and there duly assigned Serial No. 28656/1998.

BACKGROUND OF THE INVENTION

1. Field of the Invention

The present invention relates to a computer system, and more particularly, to a computer technique for providing a character conversion function to various applications running on the computer system.

2. Description of the Related Art

Application programs such as wordprocessors or editors which support the Korean language usually have a function of converting mistyping between the Korean language and the English language. The Korean/English mistyping conversion function operates such that, when a user who wishes to input Korean characters erroneously types characters in the English input mode, and not in the Korean input mode, and vice versa, the computer either automatically or on receiving instructions from the user corrects the mistyped characters.

However, to support the Korean/English mistyping conversion function, each application program must be equipped with additional code. Thus, a user cannot make use of the Korean/English mistyping conversion function at all when using an application program or an editing window provided by an operating system which does not support the mistyping conversion function.

Each of the following patents discloses features in common with the present invention but do not teach or suggest the computer system and method providing a character mistyping conversion function of the present invention: U.S. Pat. No. 4,402,058 to Aiken Jr. et al., entitled KEYBOARD MISMATCH CORRECTION, U.S. Pat. No. 5,634,134 TO Kumai et al., entitled METHOD AND APPARATUS FOR DETERMINING CHARACTER AND CHARACTER MODE FOR MULTI-LINGUAL KEYBOARD BASED ON INPUT CHARACTERS, U.S. Pat. No. 5,634,066 to Takehara et al., entitled INFORMATION PROCESSING APPARATUS, U.S. Pat. No. 5,907,821 to Kaji et al., entitled METHOD OF COMPUTER-BASED AUTOMATIC EXTRACTION OF TRANSLATION PAIRS OF WORDS FROM A BILINGUAL TEXT, U.S. Pat. No. 5,802,536 to Yoshii et al., entitled INFORMATION SEARCH AND DISPLAY APPARATUS, U.S. Pat. No. 5,127,748 to Okimoto et al., entitled DOCUMENTATION SYSTEM HAVING MULTILINGUAL FUNCTION, U.S. Pat. No. 5,713,033 to Sado, entitled ELECTRONIC EQUIPMENT DISPLAYING TRANSLATED CHARACTERS MATCHING PARTIAL CHARACTER INPUT WITH SUBSEQUENT ERASURE OF NON-MATCHING TRANSLATIONS, U.S. Pat. No. 5,617,314 to Zhong, entitled KANJI CONVERSATION RESULT AMENDING SYSTEM, and U.S. Pat. No. 5,784,069 to Daniels et al., entitled BIDIRECTIONAL CODE CONVERTER.

SUMMARY OF THE INVENTION

To solve the above problem, it is an object of the present invention to provide a character mistyping conversion method which provides a character mistyping conversion function which is generally supported by application programs or a general edition window running on an operating system.

It is another object of the present invention to provide an apparatus which adopts the character mistyping conversion method for general use.

It is still another object of the present invention to provide a computer having a character mistyping conversion function for general use.

Accordingly, to achieve the first object, there is provided a character mistyping conversion method which comprises the steps of: (a) detecting a scan code when the scan code input through a keyboard is transmitted to a kernel of an operating system via a keyboard driver; (b) analyzing the scan code detected in step (a), and if the analyzed scan code is a character key, storing the scan code in a scan code buffer and, if the analyzed scan code is not a character key, deleting all scan codes stored in the scan code buffer; and (c) deleting mistyped characters in a current window having an input focus and generating a keyboard message in the current window by character-mistyping-converting the scan code stored in the scan code buffer if an event indicating a character mistyping conversion occurs.

To achieve the second object, there is provided an apparatus for converting character mistyping installed in a computer having a keyboard and a keyboard driver as an input device, and having an operating system for converting a scan code input through the keyboard driver into a characters and for generating a keyboard message in a current window having an input focus. The apparatus comprises: a scan code detector for detecting a scan code when the scan code input through the keyboard is transmitted to a kernel of the operating system via the keyboard driver; a scan code buffer for storing a scan code; a buffer manager for analyzing the scan code detected by the scan code detector, for storing the scan code in the scan code buffer if the analyzed scan code is a character codes and for deleting all scan codes stored in the scan code buffer if the analyzed scan code is not a character code; an event detector for detecting an event indicating a character mistyping conversion; and a character mistyping converter for deleting mistyped characters in the current window having an input focus, and for generating a keyboard message in the current window by character-mistyping-converting the scan code stored in the scan code buffer when an event is detected by the event detector.

To achieve the third object, there is provided a computer having a character mistyping conversion function for general use, and having a keyboard and a keyboard driver as an input device, and having an operating system for converting a scan code input through the keyboard driver into a character, and for generating a keyboard message in a current window having an input focus. The computer comprises a key input monitoring driver for monitoring a scan code when the scan code input through the keyboard is transmitted to a kernel of the operating system via the keyboard driver; and a RAM-resident character mistyping conversion program, including code for analyzing the scan code received by the key input monitoring driver, for storing the scan code in the scan code buffer if the analyzed scan code is a character code, and for deleting all scan codes stored in the scan code buffer if the analyzed scan code is not a character codes and for deleting mistyping in the current window having an input focus, and for generating a keyboard message in the current window by character-mistyping-converting the scan code stored in the scan code buffer when an event indicating a character mistyping conversion occurs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
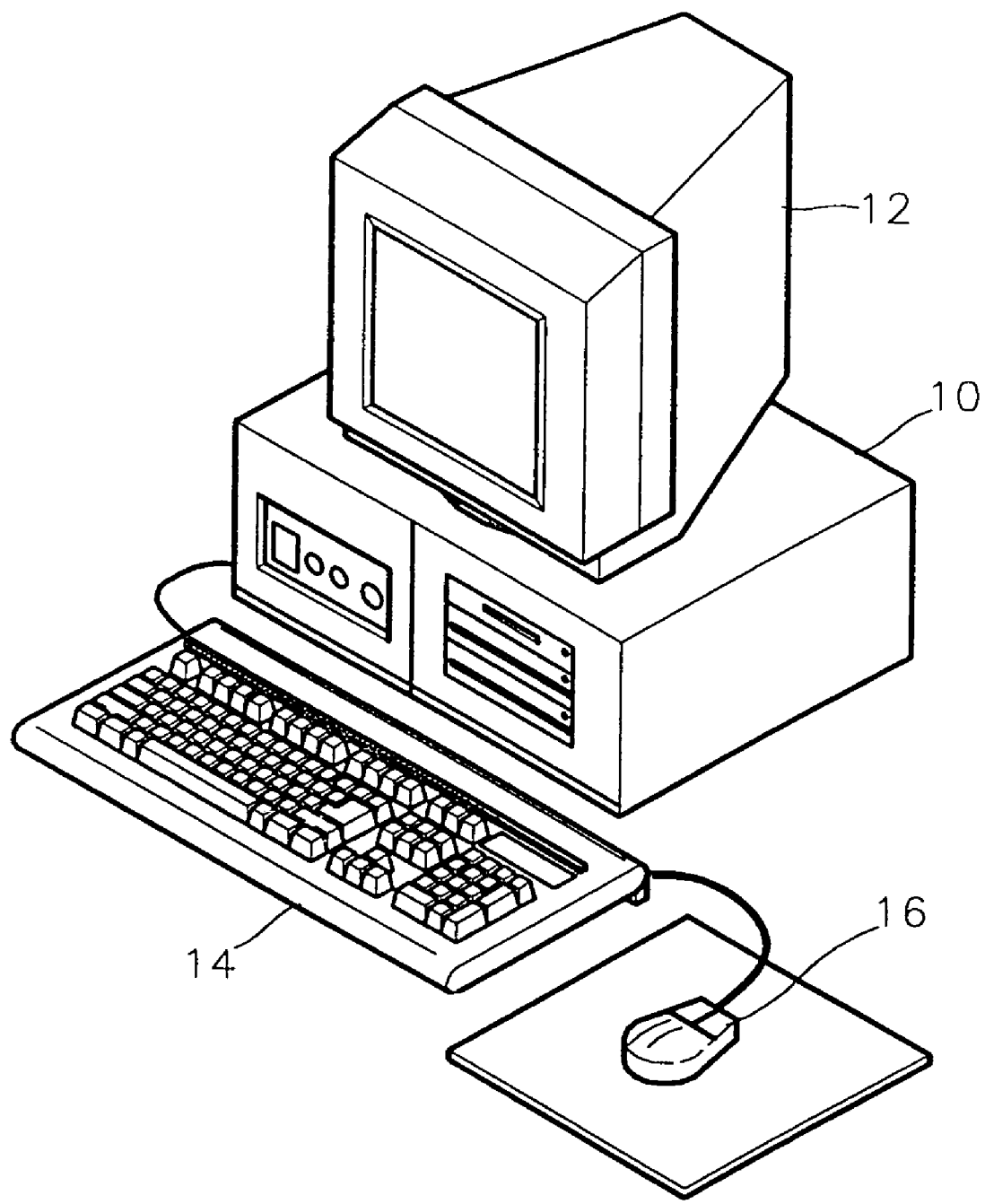
FIG. 1 is a perspective view illustrating a personal computer.

FIG. 1 shows a personal computer (PC). In FIG. 1, the PC system consists of a main body 10 and input/output devices. There are basic input/output devices such as a monitor 12, a keyboard 14, and a mouse 16.

Figure 2:
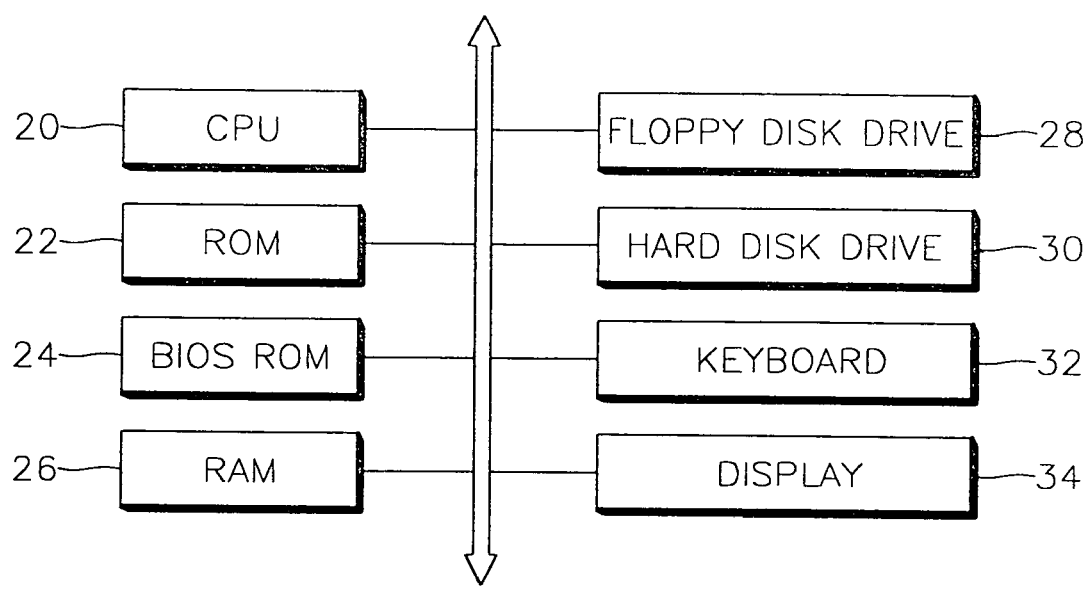
FIG. 2 is a block diagram showing the internal structure of a personal computer.

Referring to FIG. 2, a PC has: a CPU 20; a ROM 22; a BIOS (basic input/output system) ROM 24 which stores the BIOS, including a POST (power on self test) module for checking the status of a computer and for driving the computer when power is applied, and an interrupt process module for managing peripheral devices; a RAM 26 including a base memory and an extended memory; a floppy disk drive 28 and a hard disk drive 30 which are auxiliary memory storage devices; a keyboard 32 which is an input device; and a display monitor 34 which is an output device.

Figure 3:
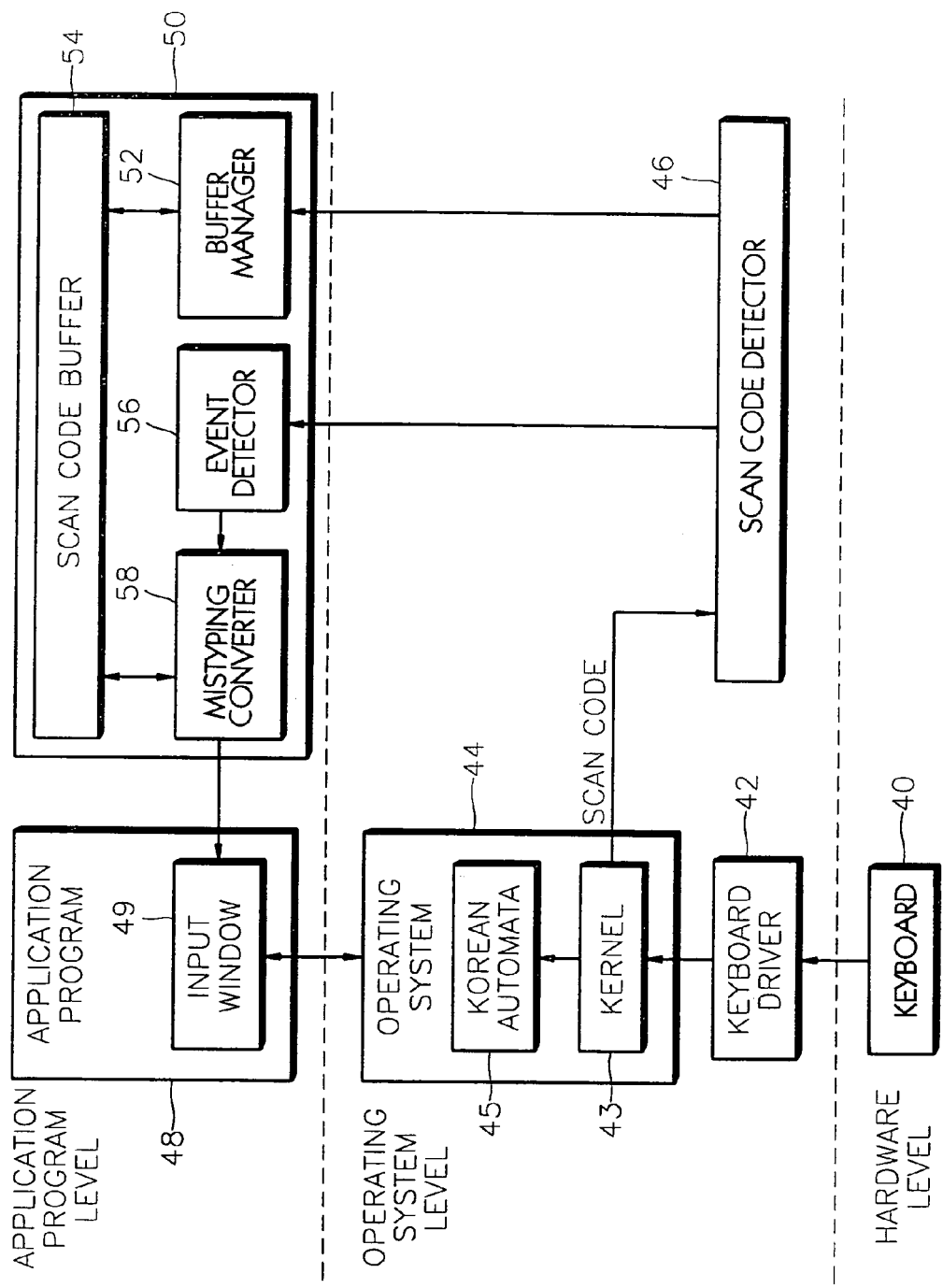
FIG. 3 is a block diagram hierarchically showing the functional structure of a computer having a character mistyping conversion function for general use according to the present invention.

Referring to FIG. 3, application programs 48 running on the operating system 44 of a computer request the operating system 44 to receive a keyboard input. When a user strokes a key of a keyboard 40, the value of the stroked key (scan code) is transmitted to a kernel 43 of the operating system 44 through a keyboard driver 42. Here, the operating system 44 supporting Korean language has a Korean automata 45 to manage the Korean input mode and the English input mode. The Korean automata 45 converts the scan code input in the Korean input mode into a 2-byte Korean code and the scan code input in the English input mode into the ASCII code and transmits the result to the application program 48 requesting the keyboard input.

In FIG. 3, a Korean/English mistyping conversion apparatus, which is a preferred embodiment of the mistyping conversion apparatus for general use according to the present inventions includes a scan code detector 46, a scan code buffer 54, a buffer manager 52, an event detector 56, and a character mistyping converter 58.

The scan code detector 46 detects a scan code input from the keyboard 40 as transmitted to a kernel 43 of an operating system 44 via a keyboard driver 42, and receives the scan code from the kernel 43. The scan code detector 46 is embodied in the form of a device driver.

The buffer manager 52 receives the scan code detected by the scan code detector 46 and analyzes the received scan code. Then, the buffer manager 52 stores the scan code in the scan code buffer 54 when the scan code is a character key and deletes all scan code stored in the scan code buffer 54 when the scan code is not a character key.

The event detector 56 detects an event indicating Korean/English mistyping conversion. In a preferred embodiment of the present invention, the event indicating the Korean/English mistyping conversion is an input of a hot key represented by simultaneously pressing both the Ctrl key and the Shift key. However, in another preferred embodiment, the event can be generated by an additional apparatus which detects input of mistyping by monitoring the scan code buffer 54.

The character mistyping converter 58, receiving a control signal indicating the detection of an event from the event detector 56, deletes the mistyping on the current window and generates a keyboard message and provides it to the current window by performing the Korean/English mistyping conversion with respect to the scan code stored in the scan code buffer 54.

In the Korean/English mistyping conversion apparatus which is a preferred embodiment of the present invention, the scan code buffer 54, the buffer manager 52, the event detector 56, and the character mistyping converter 58 can be embodied by a character mistyping conversion program 50 which is resident on a RAM.

Figure 4:
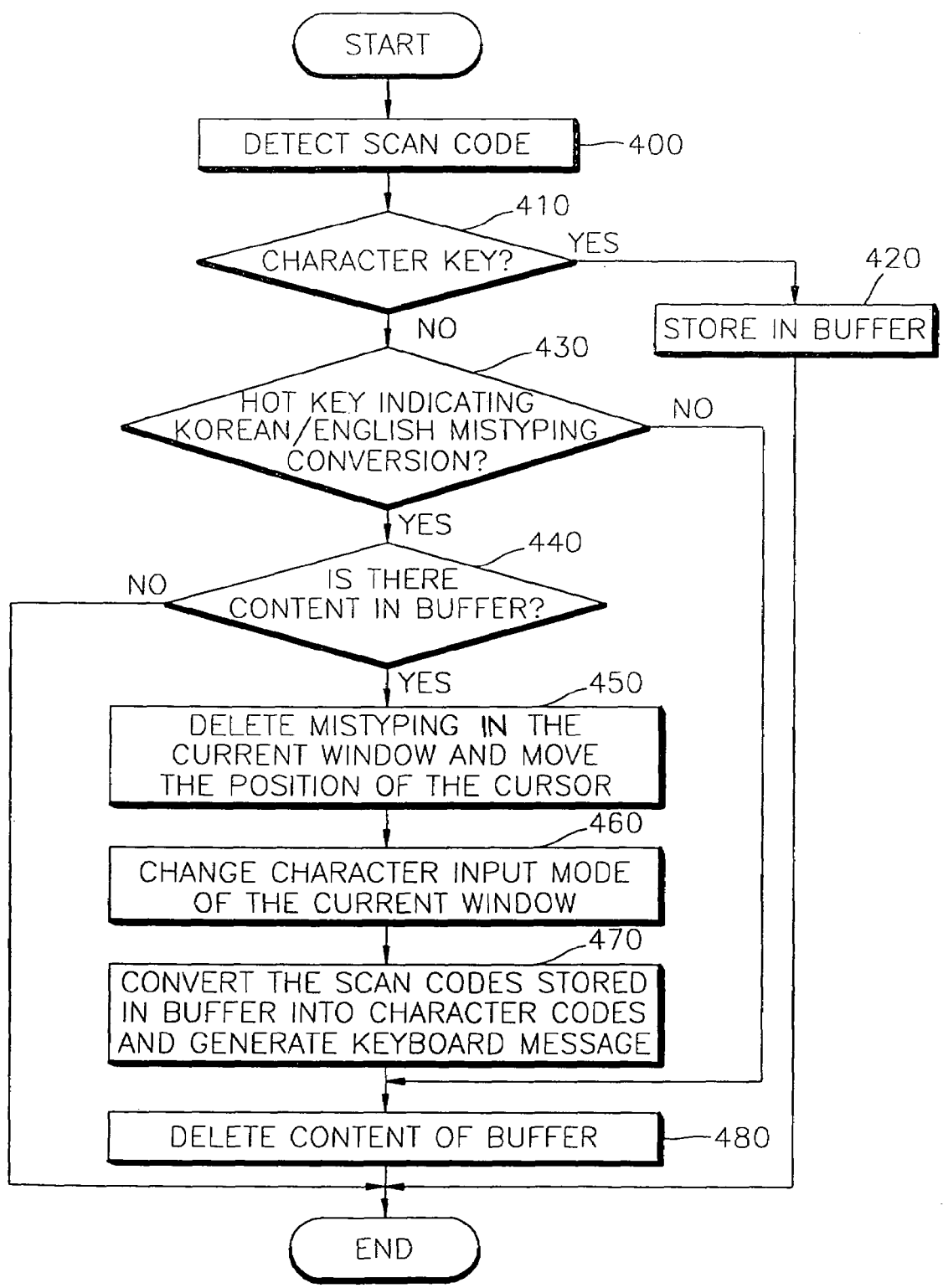
FIG. 4 is a flowchart for explaining the process of the character mistyping conversion for general use by the computer according to the present invention.

The process of the Korean/English mistyping conversion by a computer according to the present invention will be described with reference to FIGS. 3 and 4.

First, the scan code detector 46, i.e., a key input monitoring driver, detects a scan code when the scan code input from the keyboard 40 is transmitted to the kernel 43 of the operating system 44 via the keyboard driver 42 (step 400).

The character mistyping conversion program 50, being resident on a RAM, receives the detected scan code from the keyboard input monitoring driver and analyzes the received scan code. If the scan code is a character key, the scan code is stored in the scan code buffer 54 (steps 410 and 420). If the scan code is not the character key, it is determined whether the scan code is a hot key indicating the Korean/English mistyping conversion (step 430). If the scan code is not the hot key either, all scan codes stored in the scan code buffer 54 are deleted (step 480).

If the scan code is the hot key indicating the Korean/English mistyping conversion, a determination is made as to whether or not the scan code buffer 54 has any contents stored therein (step 440). If there are scan codes stored in the scan code buffer 54, the current window having an input focus is sought among the application programs running on the operating system, a mistyped portion thereof is deleted, and the cursor is moved to the position where the character originally stored in the scan code buffer 54 is written (step 450). This step is made possible by calculating the length of a character string recorded when the scan code stored in the scan code buffer 54 was virtually displayed, and displaying the Back_Space key as long as the length at the position of the current cursor. Here, the character of a 2-byte code such as a Korean language code is calculated as a single character. As the calculation of a character string becomes complicated if the combination of Korean characters is not completed, the length of a character string can be measured after a space key is automatically input at the end thereof.

Next, the character input mode of the current window is changed (step 460). That is, when mistyping occurs in the English input mode, the character input mode is changed to the Korean input mode, and when mistyping occurs in the Korean input mode, the character input mode is changed to the English input mode.

Then, the scan codes stored in the scan code buffer 54 are converted into character codes depending on the changed character input mode, and a keyboard message including the converted character codes (and corresponding to the intended key strokes) is generated in the current window (step 470). That is, the contents stored in the scan code buffer 54 are converted to a 2-byte Korean code for the Korean input mode and the ASCII code for the English input mode.

When the Korean/English mistyping conversion is completed, all scan codes stored in the scan code buffer 54 are deleted (step 480).

Figure 5A:
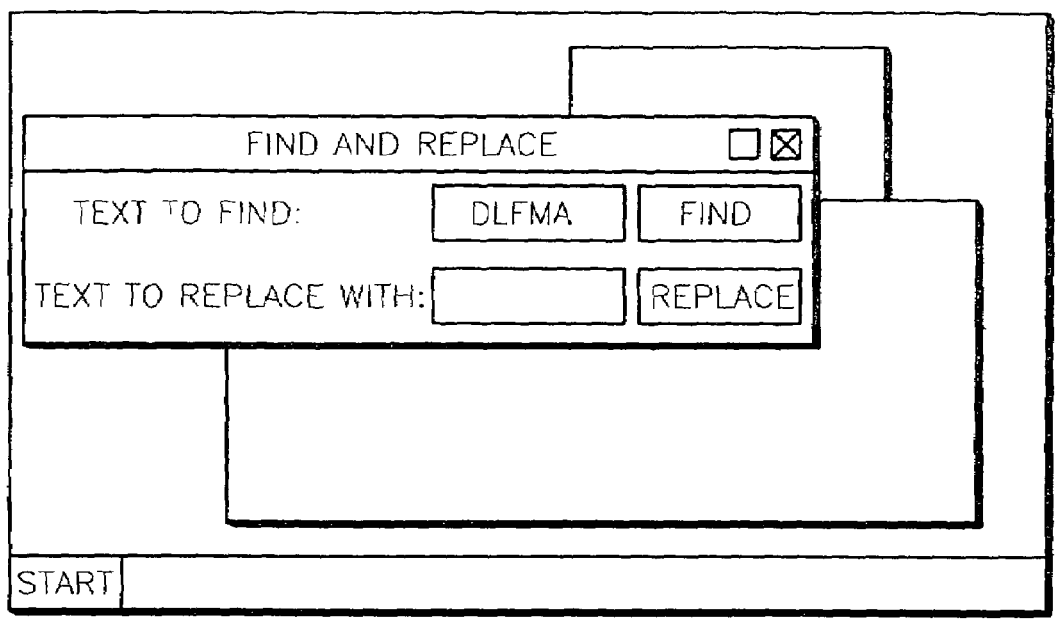
FIGS. 5A and 5B are views respectively illustrating a window in which mistyping occurs and a window in which the mistyping is converted according to the present invention.
Figure 5B:
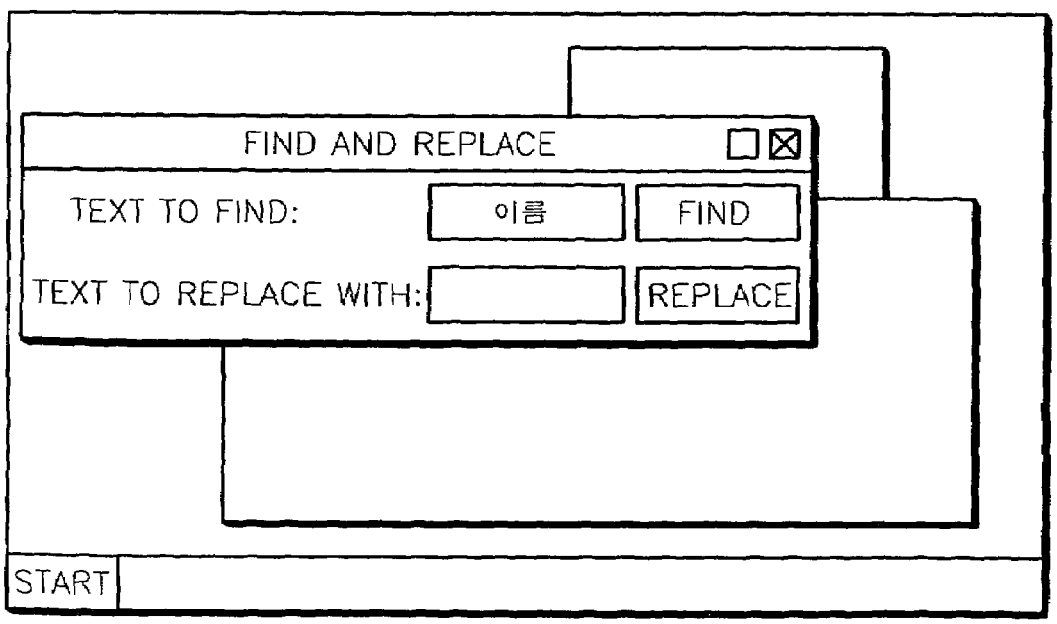

As shown in FIG. 5A, a mistyping occurs by inputting "DLFMA" on a "Find and Replace" window having an input focus. Here, when a user simultaneously presses a Ctrl key and a Shift key at the current cursor position, the "DLFMA" portion is deleted and "이름", Korean for a name, is written by the Korean/English mistyping conversion apparatus for general use of a computer according to the present invention, as shown in FIG. 5B.

The above-described Korean/English mistyping apparatus and method thereof, which are preferred embodiments of the present invention, can be embodied for mistyping conversion between languages other than Korean/English with the same inventive concept.

As described above, according to the present invention, the character mistyping conversion can be made on all application programs or general edition windows running on the operating system without additional code needed for supporting the character mistyping conversion function.

What is claimed is:

1. A character mistyping conversion method, comprising the steps of:
   (a) detecting a scan code when the scan code is input through a keyboard and is transmitted to a kernel of an operating system via a keyboard driver;
   (b) analyzing the scan code detected in step (a);
   (c) upon the analyzed scan code being a character key, storing the scan code in a scan code buffer; and
   (d) upon the analyzed scan code not being a character key, deleting mistyped characters in a current window having an input focus and generating a keyboard message corresponding to intended key strokes in the current window having the input focus by character-mistyping-converting the scan code stored in said scan code buffer upon an occurrence of an event indicating a character mistyping conversion.

2. The mistyping conversion method as claimed in claim 1, said event indicating a character mistyping conversion comprising an input via a hot key by a user which indicates the character mistyping conversion.

3. The mistyping conversion method as claimed in claim 1, step (c) comprising the sub-steps of:
   (c1) moving a cursor to a position where a character initially stored in said scan code buffer was written while deleting mistyped characters in the current window having the input focus;
   (c2) changing a character input mode of the current window;
   (c3) converting the scan codes stored in said scan code buffer into character codes depending on the changed character input mode and generating a keyboard message corresponding to intended key strokes in the current window; and
   (c4) deleting all scan codes stored in said scan code buffer.

4. The mistyping conversion method as claimed in claim 1, further comprising the step, between steps (b) and (c) of determining whether the scan code buffer contains data and, if the scan code buffer does not contain data, terminating the method, and if the scan code buffer does contain data, performing step (c).

5. The mistyping conversion method as claimed in claim 1, further comprising the sub-step in step (c), between the deleting of the mistyped characters in the current window having the input focus and the generating of the keyboard message, of changing a character input mode of the current window having the input focus.

* * * * *